(12) United States Patent
Miyata et al.

(10) Patent No.: US 6,527,662 B2
(45) Date of Patent: Mar. 4, 2003

(54) PUMP DRIVE APPARATUS

(75) Inventors: Shinji Miyata, Kanagawa (JP); Hiroyuki Itoh, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/860,454

(22) Filed: May 21, 2001

(65) Prior Publication Data
US 2002/0032095 A1 Mar. 14, 2002

(30) Foreign Application Priority Data
May 23, 2000 (JP) ........................................ 2000-151463

(51) Int. Cl.[7] .............................................. F16H 37/02
(52) U.S. Cl. ...................................................... 475/216
(58) Field of Search .......................................... 475/216

(56) References Cited

U.S. PATENT DOCUMENTS

| | | | | |
|---|---|---|---|---|
| 3,277,745 A | * | 10/1966 | Harned et al. | 475/216 |
| 4,382,188 A | * | 5/1983 | Cronin | 290/1 C |
| 4,401,938 A | * | 8/1983 | Cronin | 322/29 |
| 4,587,866 A | * | 5/1986 | Kraus | 475/216 |
| 5,820,510 A | * | 10/1998 | Ueda et al. | 475/214 |
| 6,042,499 A | * | 3/2000 | Goi et al. | 475/215 |
| 6,155,951 A | * | 12/2000 | Kuhn et al. | 475/126 |
| 6,312,358 B1 | * | 11/2001 | Goi et al. | 477/37 |

FOREIGN PATENT DOCUMENTS

| | | |
|---|---|---|
| JP | 62-71465 | 5/1987 |
| JP | 1-169169 | 7/1989 |
| JP | 1-173552 | 12/1989 |
| JP | 1-312266 | 12/1989 |
| JP | 10-196759 | 7/1998 |
| JP | 10-063146 | 3/1999 |

OTHER PUBLICATIONS

Asakura Shoten Co, *Fluid Machinery Handbook*, Feb. 9, 1998.

* cited by examiner

*Primary Examiner*—Dirk Wright
(74) *Attorney, Agent, or Firm*—Sughrue Mion, PLLC

(57) ABSTRACT

Between a water pump 3 and an electric motor 1, there is interposed a toroidal-type continuously variable transmission 2. By changing the gear change ratio of the toroidal-type continuously variable transmission 2, the water supply quantity can be changed while the electric motor 1 is being operated at a constant speed.

14 Claims, 13 Drawing Sheets

PUMP DRIVE APPARATUS

BACKGROUND OF THE INVENTION

1. Field of the Invention

A pump drive apparatus according to the invention is installed within a basement of a building and is used to pump water to be used in this building up to a water tank installed on the rooftop of the building. Or, a pump drive apparatus according to the invention can also be applied to various uses: that is, it is used to pump water up to a reservoir or a water vessel for an agricultural use or for an industrial use.

2. Description of the Related Art

For example, in the case of a building, it is impossible to supply water directly to the high floors of the building with the pressure of the water flowing through a water pipe. For this reason, in the case of an ordinary building, a water tank and a water pump are installed in the basement of the building, while the water that has been poured into the water tank from the water line is moved to another water tank installed on the rooftop of the building using the water pump. The water to be used within the building is supplied to the respective floors from the water tank installed on the rooftop using the water head pressure. By the way, as a pump which is used in this case, generally, there is used a pump of a turbo type such as a centrifugal pump, a diagonal flow pump, and an axial flow pump (especially, the centrifugal pump).

Also, as a method for changing the quantity of water to be supplied to the water tank on the rooftop of the building using the above-mentioned water pump, conventionally, for example, as stated in a book which is titled "Fluid Machinery Handbook" and is published by Asakura Shoten Co., there are known the following methods (1)–(3).

(1) A method for changing the opening angle of a flow control valve interposed between a water pump and a water tank.

(2) A method for arranging a plurality of water pumps in parallel to one another and changing the number of water pumps to be operated at the same time.

(3) A method for changing the rotation speed of an electric motor which is used to drive and rotate a water pump.

Of the above three methods (1)–(3), in the case of the method (1), when the water supply quantity is reduced down, the energy that is necessary to operate the water pump is used wastefully. That is, as pointed out in the above-mentioned book "Fluid Machinery Handbook" as well, even in case where the opening angle of the flow control valve is decreased in order to reduce the water supply quantity, the power necessary to drive the water pump cannot be reduced down to a sufficient degree that can reduce the water supply quantity; and, therefore, the energy corresponding to the power is used wastefully.

Also, in the case of the methods (2) and (3), there arise some problems: that is, because a plurality of water pumps which can be operated at the same time must be disposed, the installation cost of the water pumps is high and there is required a large space for installation of the water pumps (in the case of the method (2)); and, since it is necessary to control and rotate an electric motor having a large output, there is required a large-size inverter, which results in the increased cost (in the case of the method (3)).

SUMMARY OF THE INVENTION

The present invention aims at eliminating the problems found in the above-mentioned conventional pump drive apparatus. Accordingly, it is an object of the invention to provide a pump drive apparatus in which, while the downstream-side flow passage of a water pump is not tightened by the flow control valve, but a drive source such as an electric motor is operated at a constant speed, and the water supply quantity can be controlled by changing the operating speed of the water pump, whereby in case where the water supply quantity is reduced, the energy efficiency thereof can be enhanced.

According to a first aspect of the invention, in attaining the above object, there is provided a pump drive apparatus comprising a drive source, a pump to be driven and rotated by the drive source, and a toroidal-type continuously variable transmission interposed between the pump and drive source.

Also, according to a second aspect of the invention, in the present pump drive apparatus, the drive source includes a drive shaft, the pump includes a rotary shaft, the toroidal-type continuously variable transmission includes an input portion and an output portion, the drive shaft of the drive source is connected to the input portion of the toroidal-type continuously variable transmission in such a manner that the rotational force of the drive shaft can be transmitted to the input portion, and the output portion of the toroidal-type continuously variable transmission is connected to the rotary shaft of the pump in such a manner that the rotational force of the output portion can be transmitted to the rotary shaft.

And, according to a third aspect of the invention, the above input portion is an input shaft and the above output portion is an output gear.

Further, according to a fourth aspect of the invention, between the drive shaft and input portion, there is interposed an accelerator; and, between the rotary shaft and output portion, there is interposed a decelerator.

And, according to a fifth aspect of the invention, there is provided a pump drive apparatus comprising a drive source and a pump to be driven and rotated by the drive source, wherein, between the pump and drive source, there is interposed a continuously variable gear change apparatus; and, the continuously variable gear change apparatus is composed of a toroidal-type continuously variable transmission and a planetary gear mechanism.

And, according to a sixth aspect of the invention, in the above pump drive apparatus, the drive source includes a drive shaft, the pump includes a rotary shaft, the continuously variable gear change apparatus includes an input shaft and an output shaft, the drive shaft of the drive source is connected to the input shaft of the continuously variable gear change apparatus, the output shaft of the continuously variable gear change apparatus is connected to the rotary shaft of the pump and, between the input and output shafts, there are interposed a toroidal-type continuously variable transmission and a planetary gear mechanism.

And, according to a seventh aspect of the invention, the input and output shafts are disposed concentrically with each other.

Further, according to an eighth aspect of the invention, the above pump drive apparatus further includes a first power transmission mechanism for transmitting power input to the input shaft through the toroidal-type continuously variable transmission, and a second power transmission mechanism for transmitting power input to the input shaft not through the toroidal-type continuously variable transmission.

And, according to a ninth aspect of the invention, in the above pump drive apparatus, the planetary gear mechanism includes a sun gear, a ring gear disposed on the periphery of the sun gear, a planetary gear interposed between the sun gear and ring gear, and a carrier for supporting the planetary gear in a rotatable manner.

And, according to a tenth aspect of the invention, the planetary gear mechanism is disposed laterally of the toroidal-type continuously variable transmission.

Also, according to an eleventh aspect of the invention, between the output portion and rotary shaft, there may be interposed a joint which can be freely engaged and removed.

Further, according to a twelfth aspect of the invention, between the output shaft and rotary shaft, there may be interposed a joint which can be freely engaged and removed.

Moreover, according to a thirteenth aspect of the invention, in the intermediate portion of the first power transmission mechanism, there may be disposed a joint which can be freely engaged and removed.

In a pump drive apparatus having the above structure according to the invention, while a drive source such as an electric motor or an engine is being operated at a constant speed, by changing the gear change ratio of a toroidal-type continuously variable transmission or a continuously variable gear change apparatus, the operating speed of the water pump can be changed to thereby be able to control the quantity of water to be supplied by the water pump. Therefore, the water supply quantity can be made substantially proportionate to the energy that is required for operation of the water pump, thereby being able to avoid the wasteful energy consumption. Also, since there are eliminated the need for provision of a plurality of water pumps to be operated at the same time as well as the need for provision of a large-size inverter, neither the installation cost nor the installation space can be increased.

Further, in a pump drive apparatus according to the invention, since there is reduced the torque that is applied to a toroidal-type continuously variable transmission to be incorporated into a continuously variable gear change apparatus, even under such severe operating conditions that the pump drive apparatus is continuously operated for a long time under high loads, the durability of the toroidal-type continuously variable transmission can be secured sufficiently.

DETAILED DESCRIPTION OF THE PREFERRED EMBODIMENTS

Figure 1:
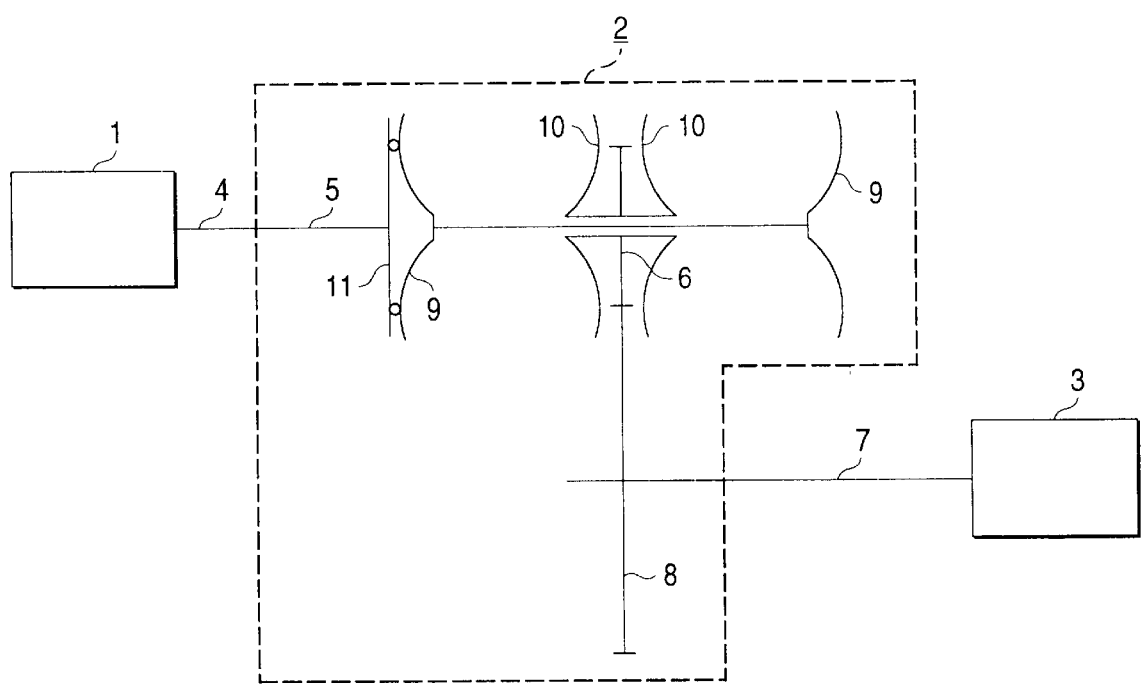
FIG. 1 is a schematic section view of a pump drive apparatus according to a first embodiment of the invention.

Now, FIG. 1 shows a pump drive apparatus according to a first embodiment of the invention. In the present pump drive apparatus, an electric motor 1 serving as a drive source, a toroidal-type continuously variable transmission 2 and a water pump 3 are disposed in series to each other with respect to the direction of power transmission. That is, the drive shaft 4 of the electric motor 1 and the input shaft 5 of the toroidal-type continuously variable transmission 2 are connected to each other in such a manner that they are concentric with each other. Also, an output gear 6, which serves as the output portion of the toroidal-type continuously variable transmission 2, and the rotary shaft 7 of the water pump 3 are connected to each other through a transmission gear 8.

The toroidal-type continuously variable transmission 2 is conventionally widely known; that is, it is disclosed in a large number of publications, for example, in JP-A-62-71465U, JP-A-1-173552U, JP-A-1-169169, JP-A-1-312266, JP-A-10-196759, and JP-A-11-63146. In the illustrated embodiment, as the toroidal-type continuously variable transmission 2, there is used a toroidal-type continuously variable transmission of a so called double cavity type in which two input side disks 9, 9 and two output side disks 10, 10 are disposed in parallel to each other with respect to the power transmission direction. Between the two input side disks 9, 9 and two output side disks 10, 10, there are respectively held a plurality of power rollers. In case where the drive shaft 4 of the electric motor 1 is rotated, due to the action of a pressing device such as a loading cam, the two input side disks 9, 9 respectively rotate while being pressed by their associated two output side disks 10, 10. And, the rotational movements of the two input side disks 9, 9 are transmitted to their associated two output side disks 10, 10 through their associated power rollers respectively. These rotational movements of the two output side disks 10, 10 are taken out from the output gear 6 to thereby drive and rotate the water pump 3.

In a pump drive apparatus having the above structure according to the present embodiment, while the electric motor 1 remains operated at a constant speed, by changing the gear change ratio of the toroidal-type continuously variable transmission 2, the operating speed of the water pump 3 can be changed to thereby be able to control the quantity of water to be supplied by the water pump 3. That is, since the water supply quantity is almost proportionate to the rotational speed of the water pump 3 and the rotation speed of the water pump 3 is proportionate to the rotation speed of the output gear 6, in case where the rotation speed of the output gear 6 is controlled by changing the gear change ratio of the toroidal-type continuously variable transmission 2, the water supply quantity can be controlled without changing the rotation speed of the drive shaft 4 of the electric motor 1.

For example, in case where the peripheral surfaces of the power rollers are respectively contacted with the near-to-inside-diameter portions of the input side disks 9, 9 and the near-to-outside-diameter portions of the output side disks 10, 10 and the gear change ratio of the toroidal-type continuously variable transmission 2 is set on the deceleration side, the water supply quantity can be reduced. In this state, there is reduced the torque that is necessary to drive and rotate the input shaft 5 of the toroidal-type continuously variable transmission 2, which in turn reduces the amount of electric power to be applied to the electric motor 1. On the other hand, in case where the peripheral surfaces of the power rollers are respectively contacted with the near-to-outside-diameter portions of the input side disks 9, 9 and the near-to-inside-diameter portions of the output side disks 10, 10 and the gear change ratio of the toroidal-type continuously variable transmission 2 is set on the acceleration side, the water supply quantity can be increased. In this state, there is increased the torque that is necessary to drive and rotate the input shaft 5 of the toroidal-type continuously variable transmission 2, which in turn increases the amount of electric power to be applied to the electric motor 1.

Figure 2:
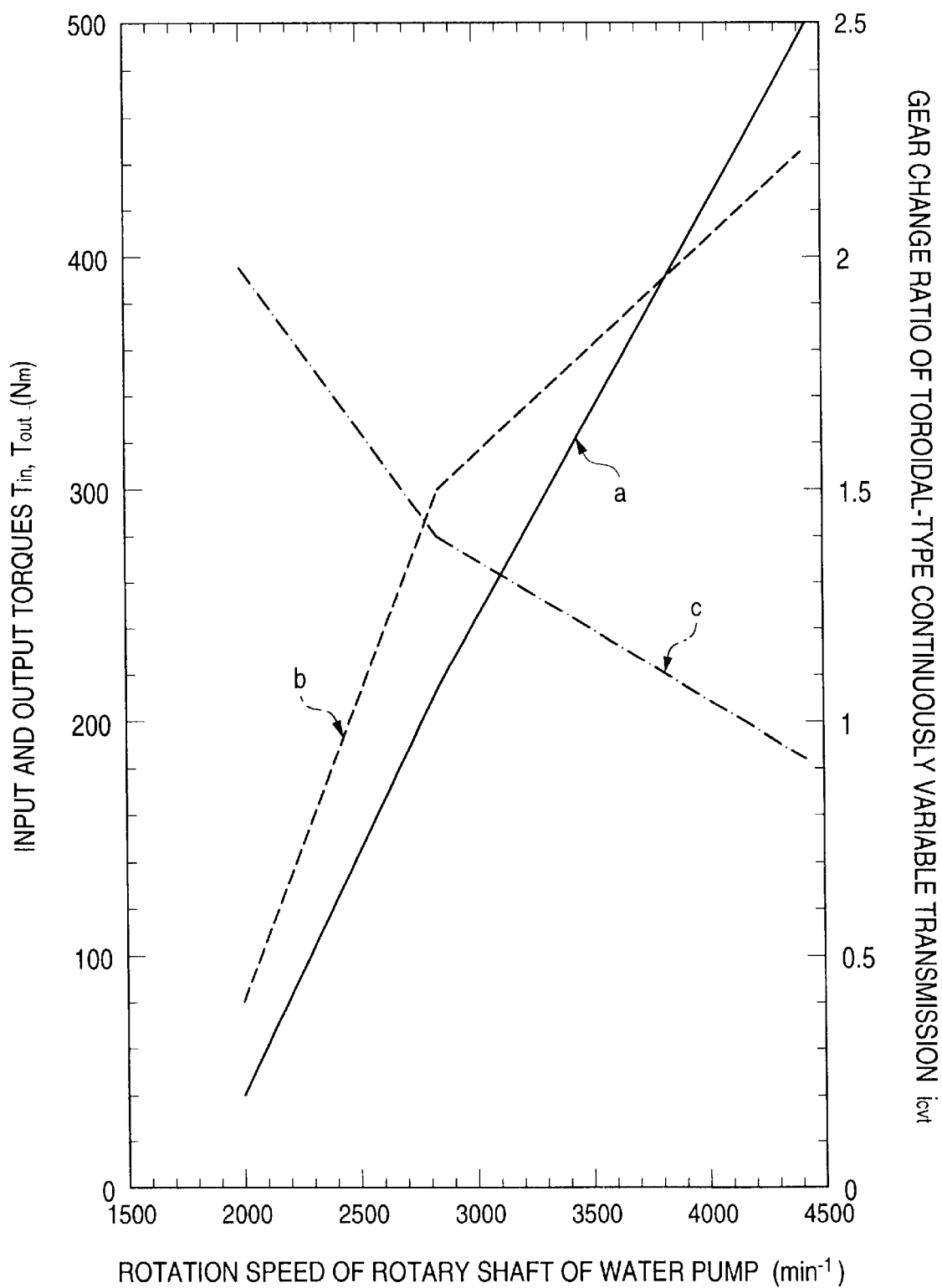
FIG. 2 is a graphical representation of the relation between the input torque of the toroidal-type continuously variable transmission, the output torque of the toroidal-type continuously variable transmission, and the gear change ratio of the toroidal-type continuously variable transmission in the first embodiment.

Now, FIG. 2 shows a case where the water supply quantity is caused to vary in the present structure and, in particular, it shows relations between the input torque (the torque that is necessary to drive and rotate the input shaft 5) $T_{in}$ of the toroidal-type continuously variable transmission 2, the output torque (the rotational torque of the output gear 6) $T_{out}$ of the toroidal-type continuously variable transmission 2, and the gear change ratio $i_{CVT}$ (in the illustrated embodiment, it includes the gear change ratio of the gears 6 and 8 as well) of the toroidal-type continuously variable transmission 2. In FIG. 2, the horizontal axis thereof expresses the rotational speed ($min^{-1}$) of the rotary shaft 7 of the water pump 3, whereas the vertical axis expresses the input and output torques $T_{in}$ and $T_{out}$ as well as the gear change ratio $i_{CVT}$. Also, a solid line a designates the input torque $T_{in}$, a broken line b stands for the output torque $T_{out}$, and a chained line c represents the gear change ratio $i_{CVT}$. By the way, when the gear change ratio $i_{CVT}$ is larger than 1, the toroidal-type continuously variable transmission 2 is in the decelerating state; and, when the gear change ratio $i_{CVT}$ is smaller than 1, the toroidal-type continuously variable transmission 2 is in the accelerating state.

Since the water supply quantity is proportionate to the rotation speed of the rotary shaft 7, as can be clearly seen from FIG. 2, the water supply quantity is almost proportionate to the input torque $T_{in}$ necessary to drive and rotate the input shaft 5 of the toroidal-type continuously variable transmission 2. Thanks to this, the water supply quantity can be made almost proportionate to the energy that is necessary to operate the water pump 3, that is, the electric power amount to be applied to the electric motor 1, thereby being able to prevent the wasteful energy consumption. Also, this eliminates the need for provision of a plurality of pumps to be operated at the same time and the need for use of a large-size inverter, so that the installation cost and the installation space can be prevented from increasing.

Figure 3:
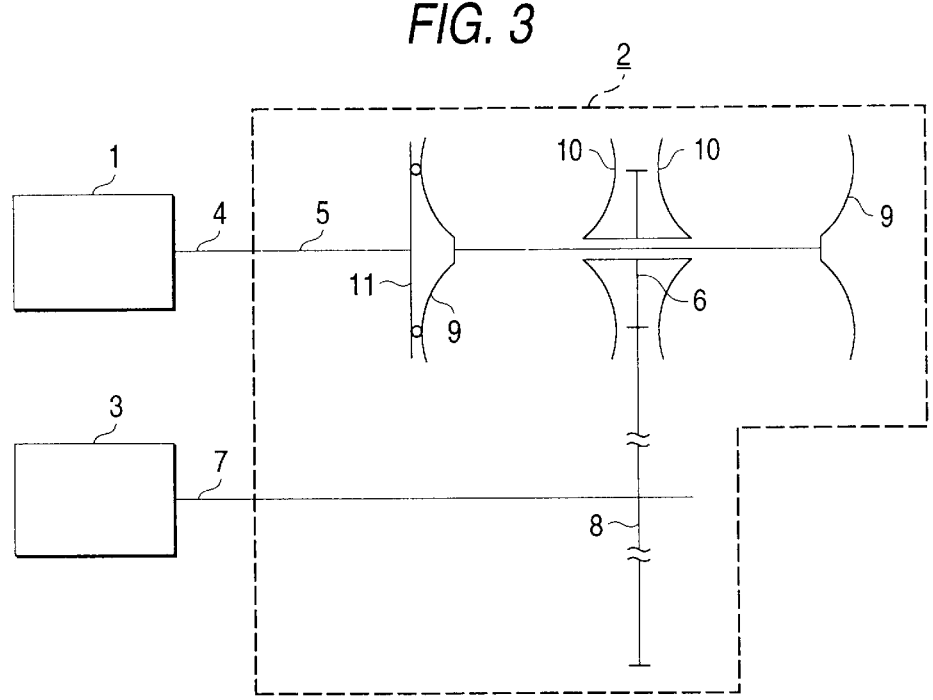
FIG. 3 is a schematic section view of a pump drive apparatus according to a second embodiment of the invention.

Next, FIG. 3 shows a pump drive apparatus according to a second embodiment of the invention. In the present embodiment, with respect to the axial direction of the toroidal-type continuously variable transmission 2, the electric motor 1 and water pump 3 are arranged on the same side. Use of such arrangement can reduce the axial-direction length of the pump drive apparatus as a whole and thus can facilitate the installation of the pump drive apparatus in a small space. The other remaining portions of the second embodiment are similar in structure and operation to those of the previously described first embodiment. Therefore, the equivalent portions thereof are given the same designations and thus the duplicate description thereof is omitted here.

Figure 4:
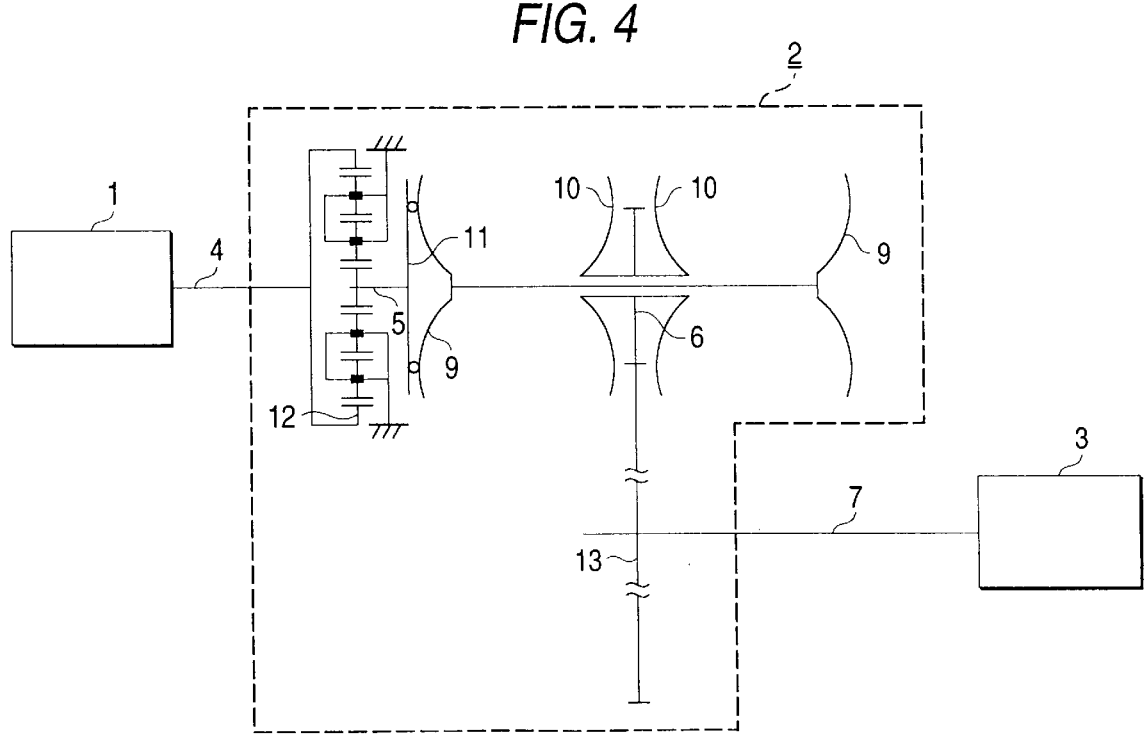
FIG. 4 is a schematic section view of a pump drive apparatus according to a third embodiment of the invention.

Next, FIG. 4 shows a pump drive apparatus according to a third embodiment of the invention. In the present embodiment, between the drive shaft 4 of the electric motor 1 and the input shaft 5 of the toroidal-type continuously variable transmission 2, there is interposed an accelerator of a planetary gear type; and, between the output gear 6 of the toroidal-type continuously variable transmission 2 and the rotary shaft 7 of the water pump 3, there is interposed a decelerator 13 of a gear type. Therefore, in the present embodiment, when the rotational force is transmitted from the electric motor 1 to the water pump 3, in the toroidal-type continuously variable transmission 2 portion of the pump drive apparatus, the rotational speed is increased but the torque is reduced. As known well, the toroidal-type continuously variable transmission 2 is able to transmit the high-speed rotation but, when an excessive torque is input therein, the durability of the toroidal-type continuously variable transmission 2 is greatly lowered. On the other hand, since the present embodiment is able to reduce the torque of the power that passes through the toroidal-type continuously variable transmission 2, the durability of the toroidal-type continuously variable transmission 2 can be enhanced. The other remaining portions of the third embodiment are similar in structure and operation to those of the previously described first embodiment. Therefore, the equivalent portions thereof are given the same designations and thus the duplicate description thereof is omitted here.

Figure 5:
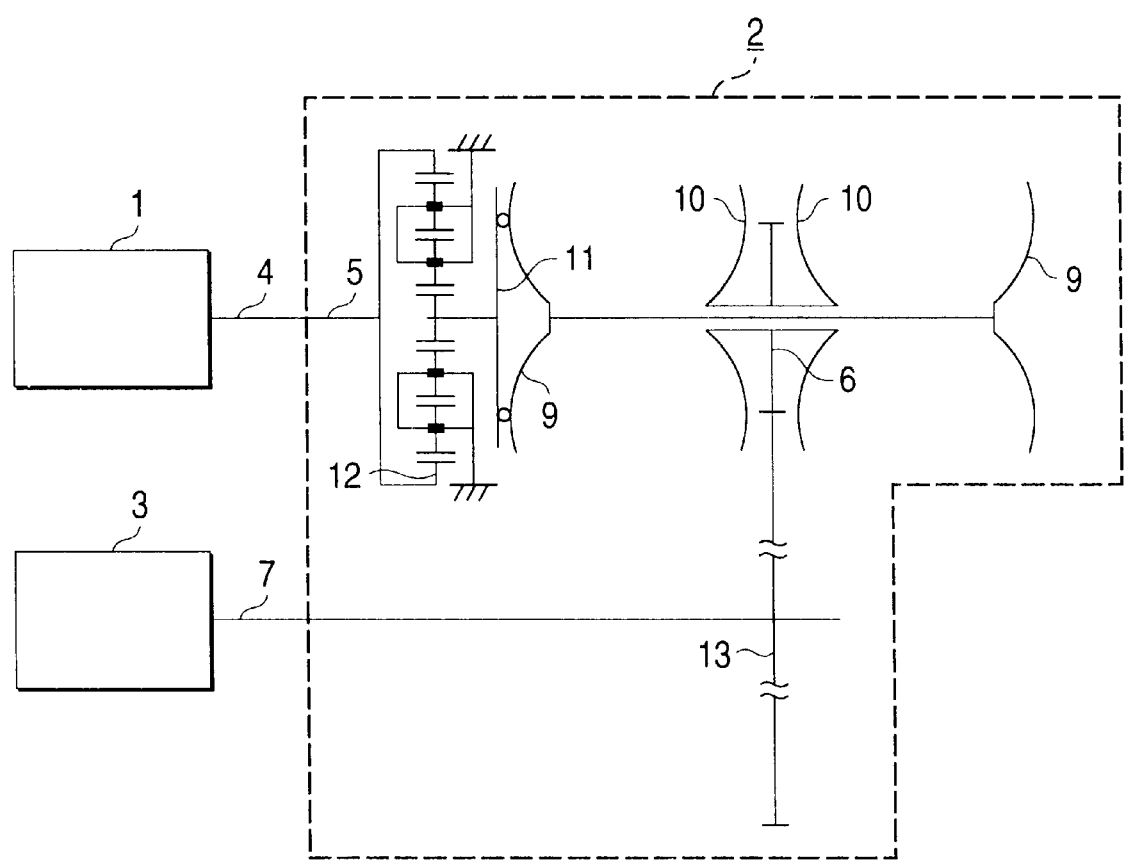
FIG. 5 is a schematic section view of a pump drive apparatus according to a fourth embodiment of the invention.

Now, FIG. 5 shows a pump drive apparatus according to a fourth embodiment of the invention. In the present embodiment, with respect to the axial direction of the toroidal-type continuously variable transmission 2, the electric motor 1 and water pump 3 are arranged on the same side. Use of such arrangement can reduce the axial-direction length of the pump drive apparatus as a whole and thus can facilitate the installation of the pump drive apparatus in a small space. The other remaining portions of the second embodiment are similar in structure and operation to those of the previously described third embodiment. Therefore, the equivalent portions thereof are given the same designations and thus the duplicate description thereof is omitted here.

Figure 6:
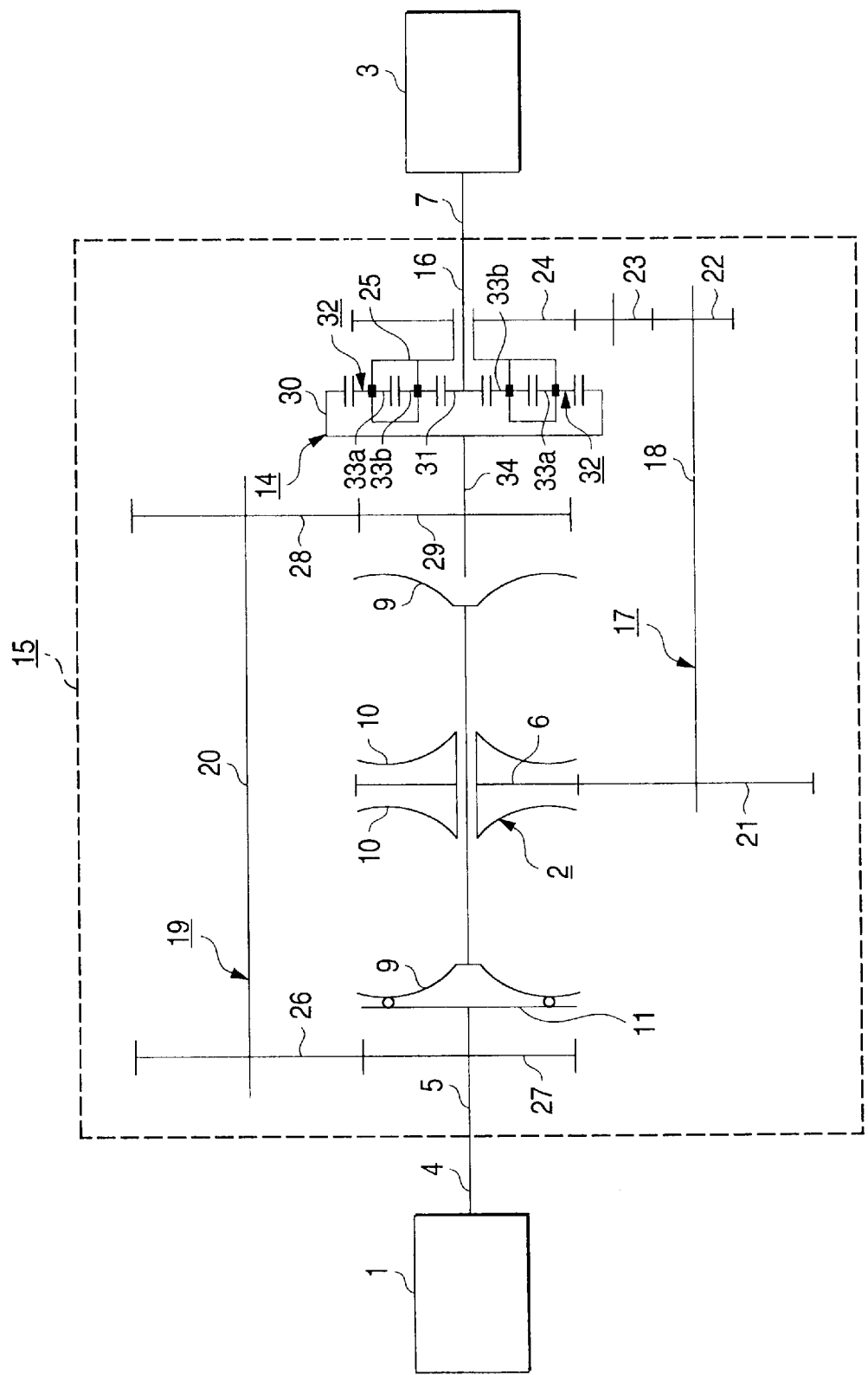
FIG. 6 is a schematic section view of a pump drive apparatus according to a fifth embodiment of the invention.

Next, FIG. 6 shows a pump drive apparatus according to a fifth embodiment of the invention. In the present embodiment, between the drive shaft 4 of the electric motor 1 serving as the drive source of the present pump drive apparatus and the rotary shaft 7 of the water pump 3, there is incorporated a continuously variable gear change apparatus 15 in series with respect to the direction of power transmission; and, the continuously variable gear change apparatus 15 consists of a combination of a toroidal-type continuously variable transmission 2 and a planetary gear mechanism 14. The continuously variable gear change apparatus 15, as disclosed in JP-A-1-169169, JP-A-1-312266, JP-A-10-196759, and JP-A-11-63146, is of a so called power circulation type in which a drive force is transmitted by the planetary gear mechanism 14 and the toroidal-type continuously variable transmission 2 is used to change the gear change ratio of the planetary gear mechanism 14, thereby reducing the torque that is applied to the toroidal-type continuously variable transmission 2. According to the continuously variable gear change apparatus 15 having the above structure, the torque of power passing through the toroidal-type continuously variable transmission 2 can be reduced and thus the durability of the component members of the toroidal-type continuously variable transmission 2 can be enhanced.

In the continuously variable gear change apparatus 15, not only the drive shaft 4 of the electric motor 1 serving as the drive source thereof and the input shaft 5 of the toroidal-type continuously variable transmission 2 are connected to each other but also an output shaft 16, which is used to take out the power that is generated due to the rotation of the input shaft 5, is disposed concentrically with the input shaft 5. And, between the input and output shafts 5 and 16, there are interposed the toroidal-type continuously variable transmission 2 and planetary gear mechanism 14 in such a manner that they are concentric with these two shafts 5 and 16. Also, the output shaft 16 is connected to the rotary shaft 7 of the water pump 3.

Also, laterally of the input and output shafts 5 and 16, there are disposed a first transmission shaft 18 used to form a first power transmission mechanism 17 and a second transmission shaft 20 used to form a second power transmission mechanism 19 in such a manner that they extend in parallel to the two shafts 5 and 16. The first power transmission mechanism 17 is used to transmit the power inputted into the input shaft 5 through the toroidal-type continuously variable transmission 2, while a gear 21 fixed to one end portion (in FIG. 6, the left end portion) of the first transmission shaft 18 is brought into meshing engagement with the output gear 6 of the toroidal-type continuously variable transmission 2. Also, the other end portion (in FIG. 6, the right end portion) of the first transmission shaft 18 is connected through gears 22–24 to a carrier 25 which forms the planetary gear mechanism 14. Therefore, when the input shaft 5 is rotated, the carrier 25 is driven and rotated through the toroidal-type continuously variable transmission 2. Also, the rotation speed of the carrier 25 can be controlled freely by changing the gear change ratio of the toroidal-type continuously variable transmission 2, even in case where the rotation speed of the input shaft 5 is kept constant.

On the other hand, the second power transmission mechanism 19 is used to transmit the power inputted into the input shaft 5 not through the toroidal-type continuously variable transmission 2, while a gear 26 fixed to one end portion (in FIG. 6, the left end portion) of the second transmission shaft 20 is brought into meshing engagement with a gear 27 fixed to the input shaft 5. Also, the other end portion (in FIG. 6, the right end portion) of the second transmission shaft 20 is connected through gears 28, 29 and a center shaft 34 to a ring gear 30 which forms the planetary gear mechanism 14. Therefore, when the input shaft 5 is rotated, the ring gear 30 is driven and rotated at such rotation speed that is proportionate to the rotation speed of the input shaft 5.

A sun gear 31, which forms the planetary gear mechanism 14, is fixed to the input side end portion (in FIG. 6, the left end portion) of the output shaft 16 and, therefore, the output shaft 16 is rotated as the sun gear 31 is rotated. On the periphery of the sun gear 31, the ring gear 30 is supported concentrically with the sun gear 31 as well as in a freely rotatable manner. And, between the inner peripheral surface of the ring gear 30 and the outer peripheral surface of the sun gear 31, there are interposed a plurality of (normally, three or four) planetary gear sets 32, 32. In the illustrated embodiment, each of the planetary gear sets 32, 32 consists of a combination of a pair of planetary gears 33a and 33b. Each pair of planetary gears 33a and 33b are meshingly engaged with each other; and also, the planetary gear 33a disposed on the outside diameter side is meshingly engaged with the ring gear 30, whereas the planetary gear 33b disposed on the inside diameter side is meshingly engaged with the sun gear 31. The reason why each of the planetary gear sets 32, 32 is composed of a pair of planetary gears 33a and 33b is to allow the rotation direction of the ring gear 30 to coincide with that of the sun gear 31. Therefore, in case where it is not necessary to allow the rotation direction of the ring gear 30 to coincide with that of the sun gear 31 in view of their relationships with other component members, a single planetary gear may be meshingly engaged with both of the ring gear 30 and sun gear 31. The thus structured planetary gear sets 32, 32 are rotatably supported on one side surface (in FIG. 6, the left side surface) of the carrier 25. Also, the carrier 25 is supported on the periphery of the intermediate portion of the output shaft 16 in such a manner that it can be rotated with respect to the output shaft 16.

In the present structure incorporating therein the above-structured continuously variable gear change apparatus 15, in case where the input shaft 5 is rotated, the power of the input shaft 5 is transmitted to the output shaft 16 by the second transmission shaft 20 and the gears 26–29 which respectively form the second power transmission mechanism 19. That is, in case where the input shaft 5 is rotated, the rotation of the input shaft 5 is transmitted through the second power transmission mechanism 19 to the center shaft 34 to thereby rotate the ring gear 30 fixed to the center shaft 34. And, the rotation of the ring gear 30 is transmitted through the plurality of planetary gear sets 32, 32 to the sun gear 31 to thereby rotate the output shaft 16 with the sun gear 31 fixed thereto. In case where the ring gear 30 is disposed on the input side, assuming that the respective planetary gear sets 32, 32 are stationary (do not rotate around the periphery of the sun gear 31), the planetary gear mechanism 14 increases its rotation speed with the gear change ratio that corresponds to the ratio of the numbers of the teeth of the ring gear 30 and sun gear 31. However, actually, the planetary gear sets 32, 32 rotate around the periphery of the sun gear 31 and thus the gear change ratio of the whole of the continuously variable gear change apparatus varies according to the rotation speed of the planetary gear sets 32, 32. Accordingly, in case where the rotation speed around the sun gear 31 of the planetary gear sets 32, 32 is changed by changing the gear change ratio of the toroidal-type continuously variable transmission 2, the gear change ratio of the whole of the continuously variable gear change apparatus 15 can be controlled.

That is, when the water pump 3 is driven and rotated by the electric motor 1, the planetary gear sets 32, 32 can be rotated around the sun gear 31 in the same direction as the ring gear 30. And, the slower the rotation speed around the sun gear 31 of the planetary gear sets 32, 32 is, the faster the rotation speed of the output shaft 16 with the sun gear 31 fixed thereto is. For example, in case where the rotation speed around the sun gear 31 of the planetary gear sets 32, 32 is equal to the rotation speed of the ring gear 30 (both of the rotation speeds are angular velocities), the rotation speeds of the ring gear 30 and output shaft 16 are equal to each other. And, in case where the rotation speed around the sun gear 31 of the planetary gear sets 32, 32 is slower than the rotation speed of the ring gear 30, the rotation speed of the output shaft 16 is faster than the rotation speed of the ring gear 30. On the other hand, in case where the rotation speed around the sun gear 31 of the planetary gear sets 32, 32 is faster than the rotation speed of the ring gear 30, the rotation speed of the output shaft 16 is slower than the rotation speed of the ring gear 30.

Therefore, as the gear change ratio of the toroidal-type continuously variable transmission 2 is changed further toward the deceleration side, the gear change ratio of the whole of the continuously variable gear change apparatus 15 is changed further toward the acceleration side. In this state, to the toroidal-type continuously variable transmission 2, there is applied torque not from the input side disks 9, 9 but from the output side disks 10, 10. That is, the torque transmitted from the electric motor 1 to the input shaft 5 is transmitted through the second power transmission mechanism 19 to the ring gear 30 of the planetary gear mechanism 14 before the pressing device 11 incorporated into the toroidal-type continuously variable transmission 2 presses against the input side disks 9, 9. Therefore, there is little torque which is transmitted from the input shaft 5 through the pressing device 11 to the input side disks 9, 9.

On the other hand, torque, which is transmitted through the second power transmission mechanism 19 to the ring gear 30 of the planetary gear mechanism 14, is in part transmitted from the planetary gear sets 32, 32 through the carrier 25 and first power transmission mechanism 17 to the output side disks 10, 10. The torque, which is applied from the output side disks 10, 10 to the toroidal-type continuously variable transmission 2 in this manner, becomes smaller as the gear change ratio of the toroidal-type continuously variable transmission 2 is changed further toward the deceleration side so as to change the gear change ratio of the whole of the continuously variable gear change apparatus 15 further toward the acceleration side. As a result of this, when rotating the water pump 3 at high speeds, by reducing the torque inputted to the toroidal-type continuously variable transmission 2, the durability of the component members of the toroidal-type continuously variable transmission 2 can be enhanced.

Figure 7:
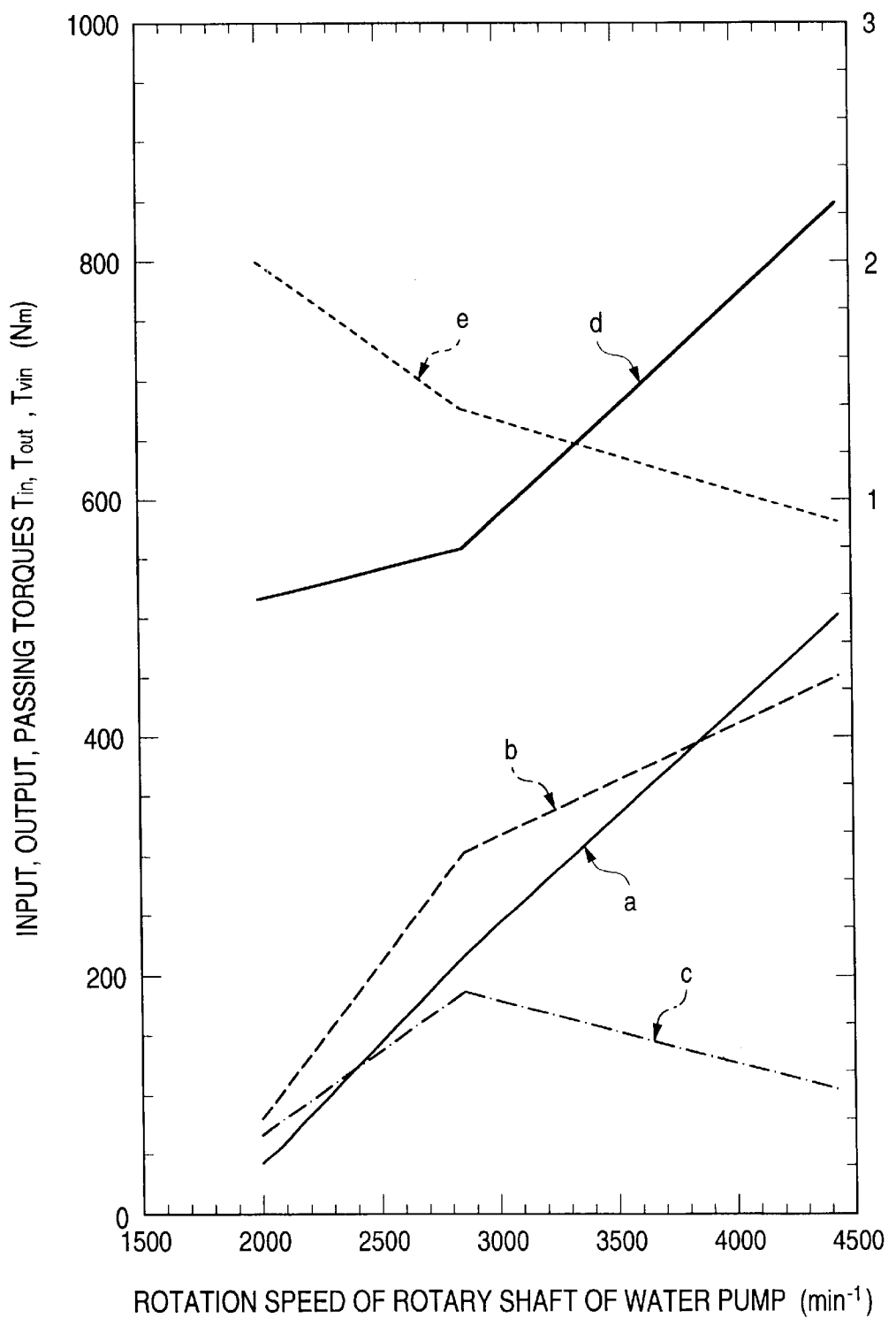
FIG. 7 is a graphical representation of the relation between the input torque of a continuously variable gear change apparatus, the output torque of the continuously variable gear change apparatus, the gear change ratio of the continuously variable gear change apparatus, the torque of power that passes through a toroidal-type continuously variable transmission, and the gear change ratio of the toroidal-type continuously variable transmission in the fifth embodiment.

Now, FIG. 7 shows a case where the water supply quantity is caused to vary in the present structure and, in particular, FIG. 7 shows relations between the input torque (the torque that is necessary to drive and rotate the input shaft 5) $T_{in}$ of the continuously variable gear change apparatus 15, the output torque (the rotational torque of the sun gear 31) $T_{out}$ of the continuously variable gear change apparatus 15, the torque $T_{vin}$ of the power that passes through the toroidal-type continuously variable transmission 2 incorporated in the continuously variable gear change apparatus 15, the gear change ratio $i_v$ of the whole of the continuously variable gear change apparatus 15, and the gear change ratio $i_{CVT}$ of the toroidal-type continuously variable transmission 2. In FIG. 7, the horizontal axis thereof expresses the rotational speed (min$^{-1}$) of the rotary shaft 7 of the water pump 3, whereas the vertical axis expresses the input, output and passing torques $T_{in}$, $T_{out}$ and $T_{vin}$ as well as the gear change ratios $i_v$ and $i_{CVT}$. Also, a solid line a designates the input torque $T_{in}$, a broken line b stands for the output torque $T_{out}$, a chained line c represents the passing torque $T_{vin}$, a solid line d expresses the gear change ratio $i_v$ of the whole of the continuously variable gear change apparatus 15, and a broken line e points out the gear change ratio $i_{CVT}$ of the toroidal-type continuously variable transmission 2.

As described above, since the water supply quantity is proportionate to the rotation speed of the rotary shaft 7 of the water pump 3, as can be clearly seen from the statements shown on FIG. 7, the water supply quantity is almost proportionate to the input torque $T_{in}$ necessary to drive and rotate the input shaft 5 of the toroidal-type continuously variable transmission 2. Thanks to this, the water supply quantity can be made almost proportionate to the energy that is necessary to operate the water pump 3, that is, the electric power amount to be applied to the electric motor 1, thereby being able to prevent the wasteful energy consumption. Also, this eliminates the need for provision of a plurality of pumps to be operated at the same time and the need for use of a large-size inverter, so that the installation cost and the installation space can be prevented from increasing. Further, in the case of the present embodiment, as can be clearly understood when the FIGS. 2 and 7 are compared with each other, by reducing the torque $T_{vin}$ of the power passing through the toroidal-type continuously variable transmission 2, the durability of the component members of the toroidal-type continuously variable transmission 2 can be enhanced. By the way, the degree of reduction of the torque $T_{vin}$ of the power passing through the toroidal-type continuously variable transmission 2 can be decided in terms of design according to the ratio of the numbers of the teeth of the gears that form the planetary gear mechanism 14, first and second power transmission mechanisms 17 and 19, respectively. Also, as for the concrete values thereof, as disclosed in the above-cited JP-A-10-196196, they are conventionally known and thus the detailed description thereof is omitted here.

Figure 8:
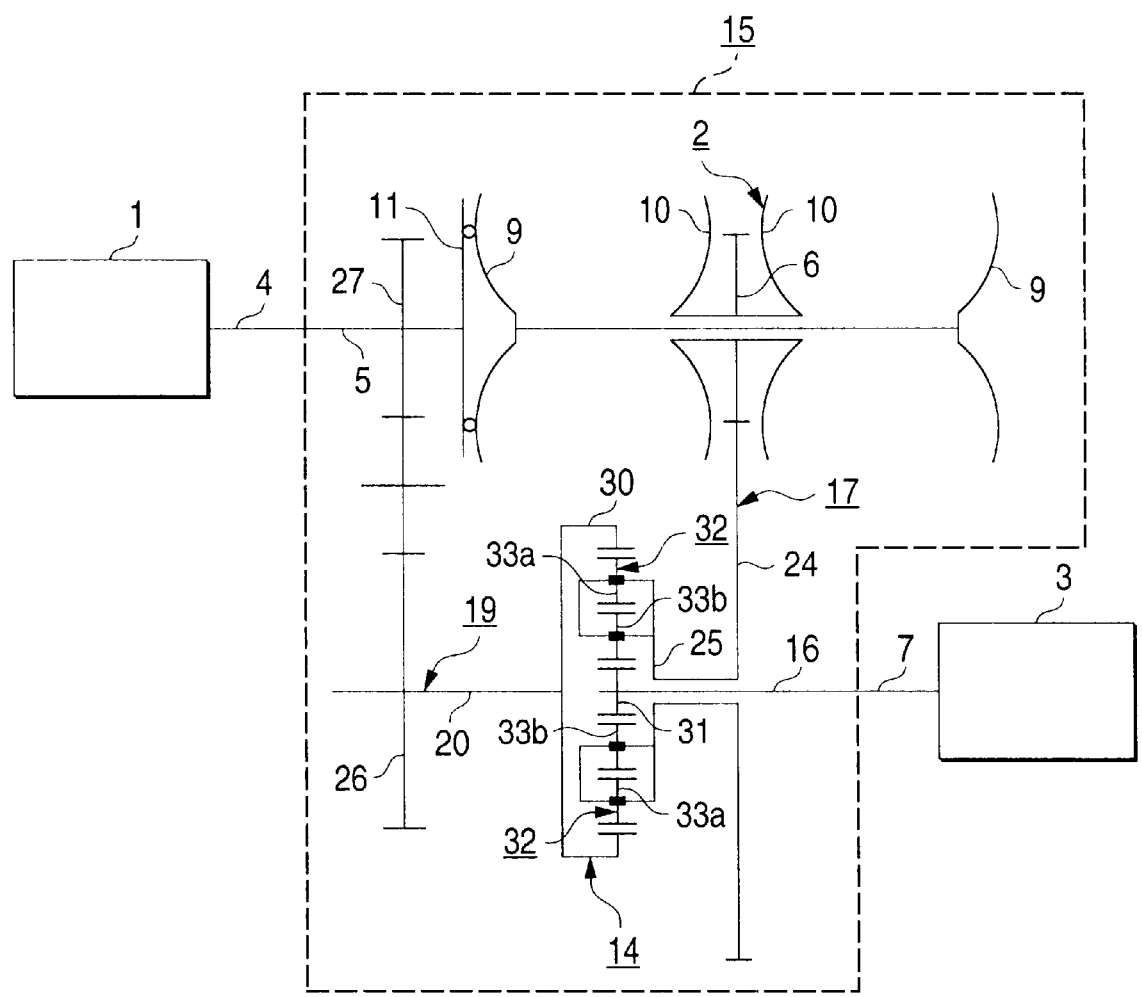
FIG. 8 is a schematic section view of a pump drive apparatus according to a sixth embodiment of the invention.

Next, FIG. 8 shows a pump drive apparatus according to a sixth embodiment of the invention. In the present embodiment, a planetary gear mechanism 14, which cooperates with a toroidal-type continuously variable transmission 2 in forming a continuously variable gear change apparatus 15, is disposed laterally of the toroidal-type continuously variable transmission 2. Employment of such arrangement can reduce the axial-direction length of the whole of the pump drive apparatus and thus can facilitate the installation of the pump drive apparatus in a narrow space. The other remaining portions of the six embodiment are basically similar in structure and operation to those of the above-mentioned fifth embodiment, except that the combination of the gears forming the first and second power transmission mechanisms 17 and 19 are changed by changing the arrangement thereof. Therefore, the equivalent portions are given the same reference characters and thus the duplicate description thereof is omitted here.

Figure 9:
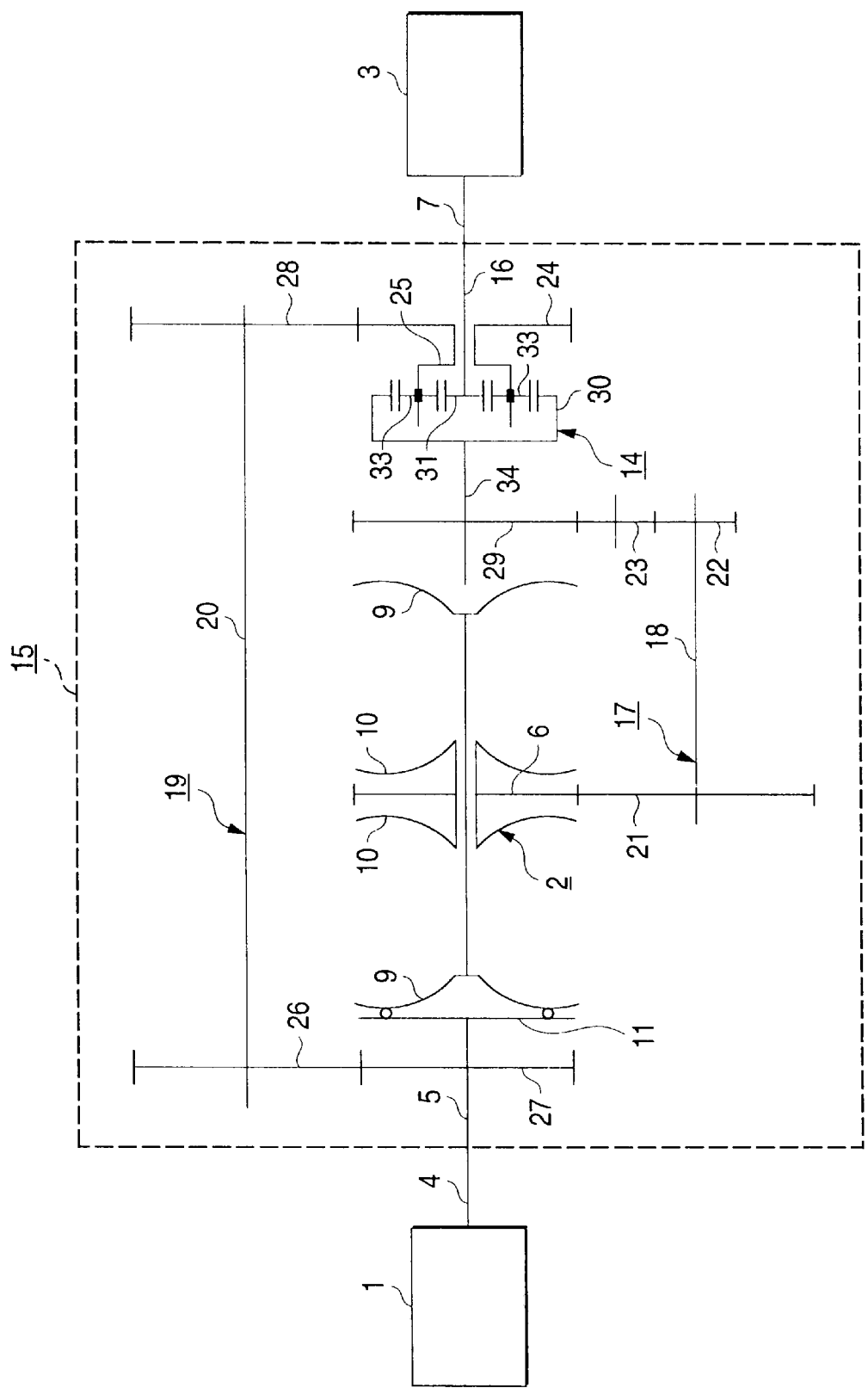
FIG. 9 is a schematic section view of a pump drive apparatus according to a seventh embodiment of the invention.

Next, FIG. 9 shows a pump drive apparatus according to a seventh embodiment of the invention. In the present embodiment, the end portion of a first power transmission mechanism 17 is connected to a ring gear 30 which forms a planetary gear mechanism 14, while the end portion of a second power transmission mechanism 19 is connected to a carrier 25 forming the planetary gear mechanism 14. Also, on the carrier 25, there are supported planetary gears 33, 33 each of a single pinion type in such a manner that they can be rotated. In the present embodiment as well, by changing the gear change ratio of the toroidal-type continuously variable transmission 2, the gear change ratio of the whole of the continuously variable gear change apparatus 15 can be changed. Further, by reducing the torque of the power passing through the toroidal-type continuously variable transmission 2, the durability of the component members of the toroidal-type continuously variable transmission 2 can be enhanced.

Figure 10:
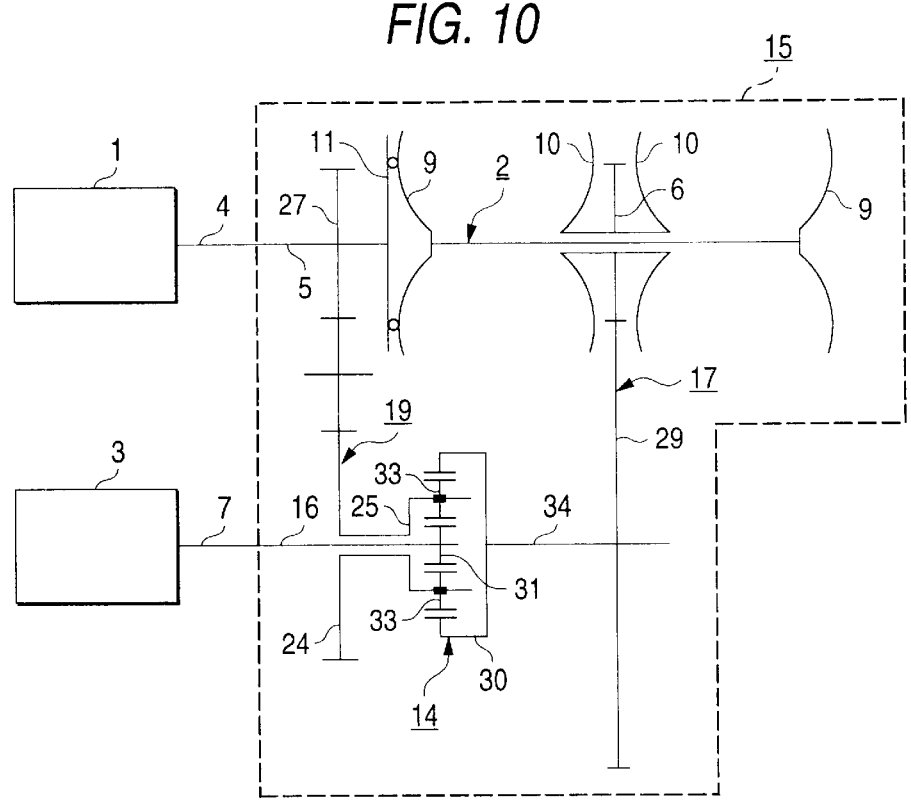
FIG. 10 is a schematic section view of a pump drive apparatus according to an eighth embodiment of the invention.

Next, FIG. 10 shows a pump drive apparatus according to an eighth embodiment of the invention. In the present embodiment, a planetary gear mechanism 14, which cooperates with a toroidal-type continuously variable transmission 2 in forming a continuously variable gear change apparatus 15, is disposed laterally of the toroidal-type continuously variable transmission 2. Employment of such arrangement can reduce the axial-direction length of the whole of the pump drive apparatus and thus can facilitate the installation of the pump drive apparatus in a narrow space. The other remaining portions of the eighth embodiment are basically similar in structure and operation to those of the above-mentioned seventh embodiment, except that the combination of the gears forming the first and second power transmission mechanisms 17 and 19 are changed by changing the arrangement thereof. Therefore, the equivalent portions are given the same reference characters and thus the duplicate description thereof is omitted here.

Figure 11:
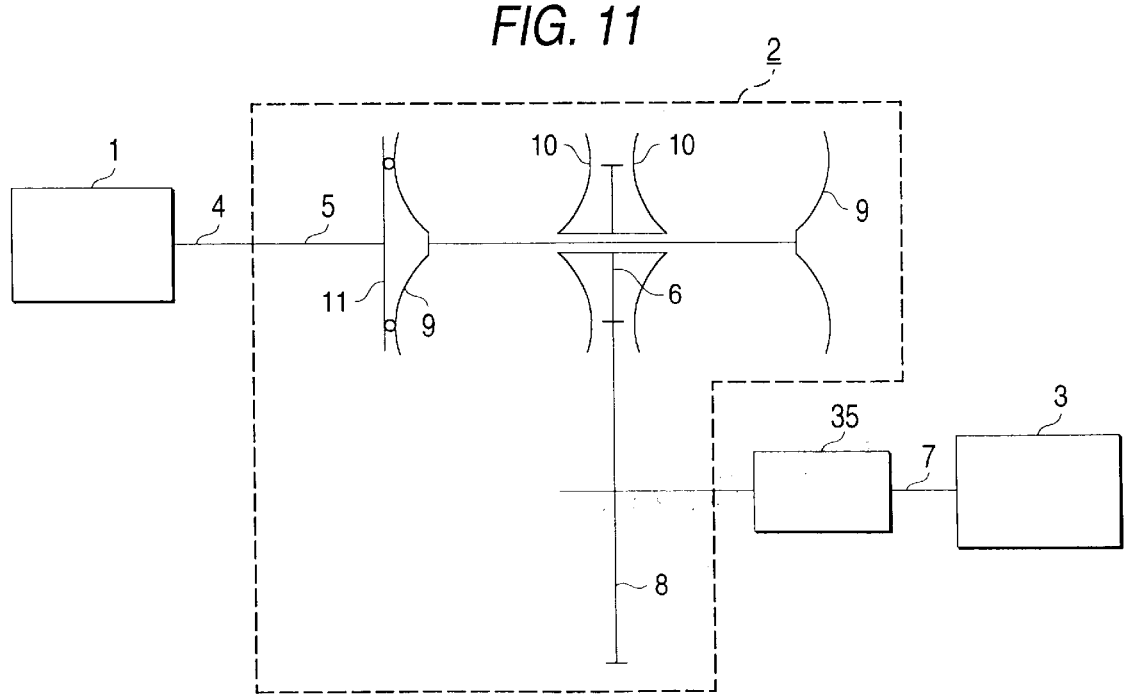
FIG. 11 is a schematic section view of a pump drive apparatus according to a ninth embodiment of the invention.

Now, FIG. 11 shows a pump drive apparatus according to a ninth embodiment of the invention. In the present embodiment, between the output gear 6 of a toroidal-type continuously variable transmission 2 serving as the output part of the present pump drive apparatus and the rotary shaft 7 of a water pump 3, there is interposed a joint 35 which can be freely engaged and removed. Provision of such joint 35 can facilitate the execution of an operation confirmation test in the actual installation site thereof. That is, since the toroidal-type continuously variable transmission 2 has a complicated structure in which a large number of parts are combined together, preferably, the operation confirmation test may be conducted not only in a factory but also in the actual installation site of the pump drive apparatus. Also, preferably, such operation confirmation test may be conducted not only when the pump drive apparatus is installed but also after the toroidal-type continuously variable transmission 2 is repaired, in a state where the joint 35 is separated from the water pump 3. According to the present structure, in such case, since the operation confirmation test can be conducted while the joint 35 is separated from the water pump 3, even in case where there is something wrong with the power transmission part of the pump drive apparatus, the water pump 3 can be prevented against damage during execution of the operation confirmation test.

Figure 12:
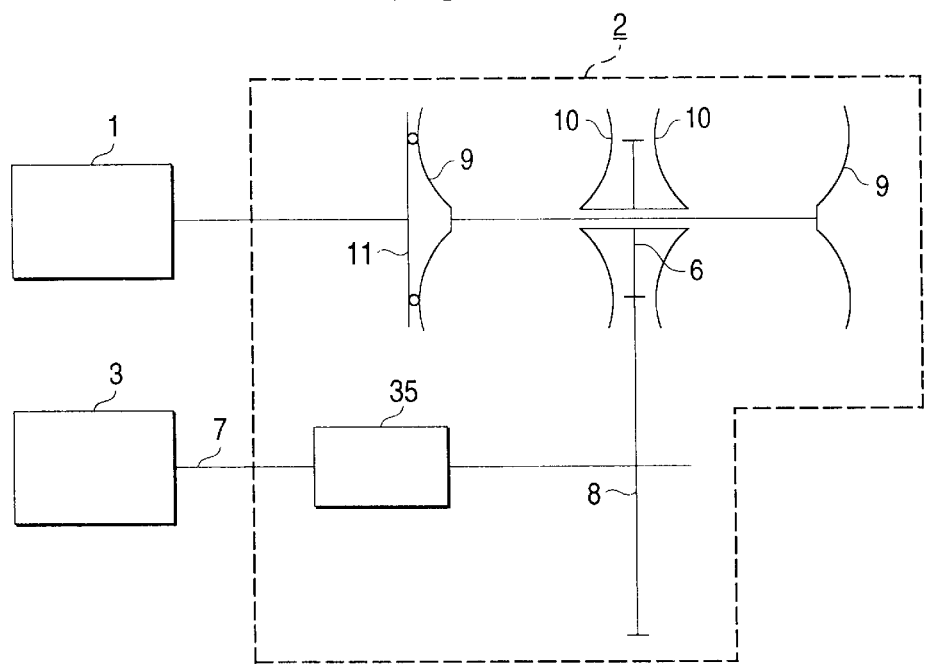
FIG. 12 is a schematic section view of a pump drive apparatus according to a tenth embodiment of the invention.

Next, FIG. 12 shows a pump drive apparatus according to a tenth embodiment of the invention. In the present embodiment, with respect to the axial direction of a toroidal-type continuously variable transmission 2, an electric motor 1 and a water pump 3 are disposed on the same side. Employment of such arrangement can reduce the axial-direction length of the whole of the pump drive apparatus and thus can facilitate the installation of the pump drive apparatus in a narrow space. The other remaining portions of the present embodiment are similar in structure and operation to those of the last-mentioned ninth embodiment. Therefore, the equivalent parts thereof are given the same reference characters and thus the duplicate description thereof is omitted here.

Figure 13:
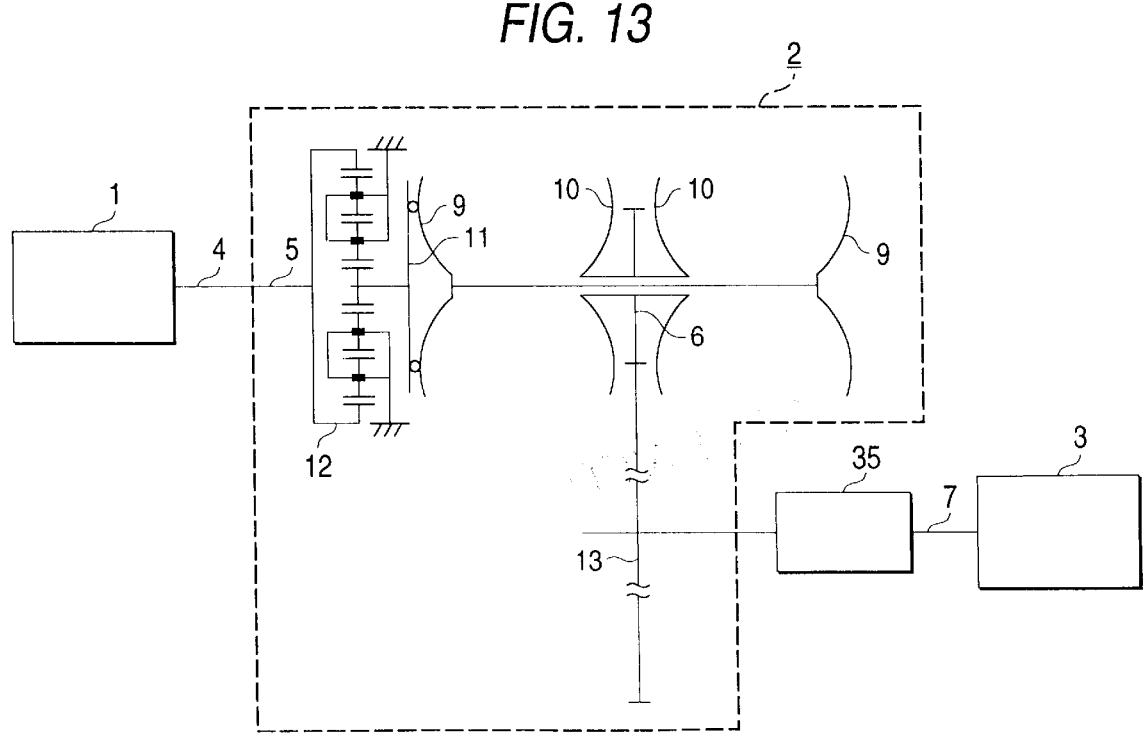
FIG. 13 is a schematic section view of a pump drive apparatus according to an eleventh embodiment of the invention.
Figure 14:
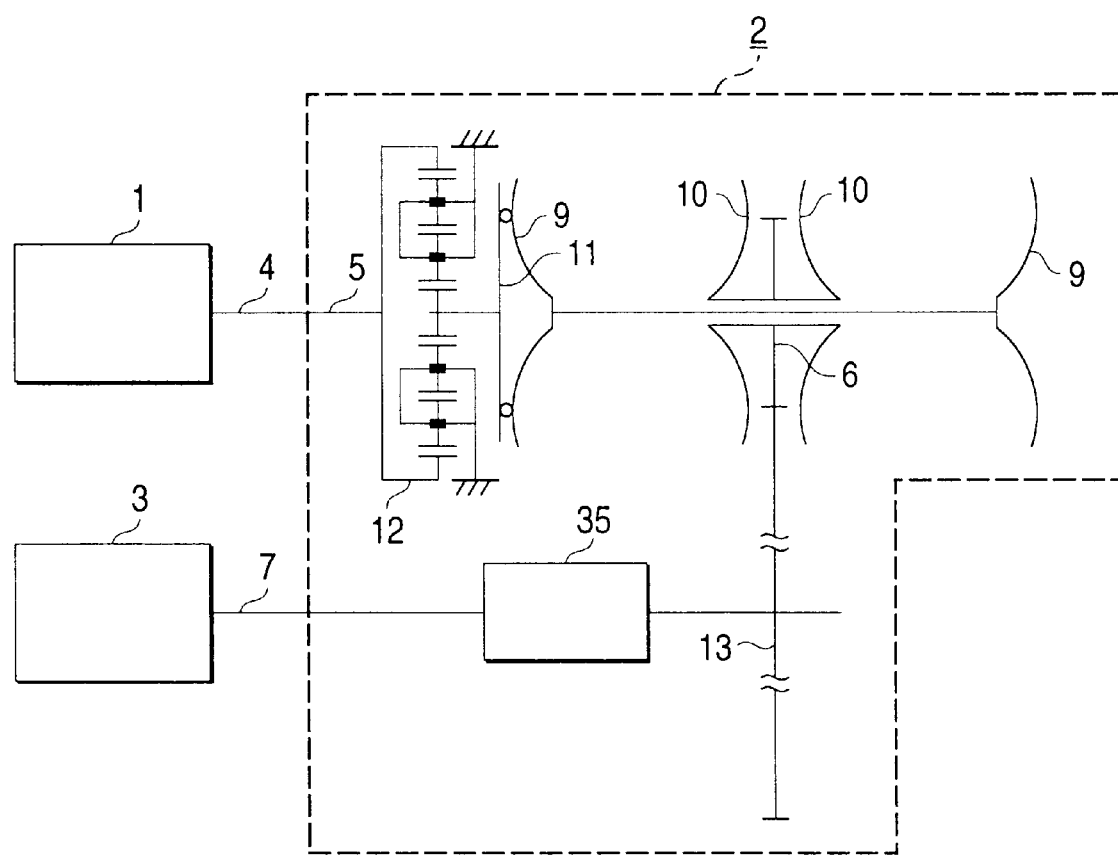
FIG. 14 is a schematic section view of a pump drive apparatus according to a twelfth embodiment of the invention.

Next, FIGS. 13 and 14 respectively show pump drive apparatuses according to an eleventh embodiment and a twelfth embodiment of the invention. In the present embodiments, a joint 35 is incorporated into each of the structures of the third and fourth embodiments respectively shown in FIGS. 4 and 5. These embodiments are similar to the previously described third and fourth embodiments in that the torque of power passing through the toroidal-type continuously variable transmission 2 can be reduced; and, they are similar to the previously described ninth embodiment in that the joint 35 is disposed to thereby facilitate the conduct of the operation confirmation test. Therefore, the equivalent portions thereof are given the same designations and thus the duplicate description thereof is omitted here.

Figure 15:
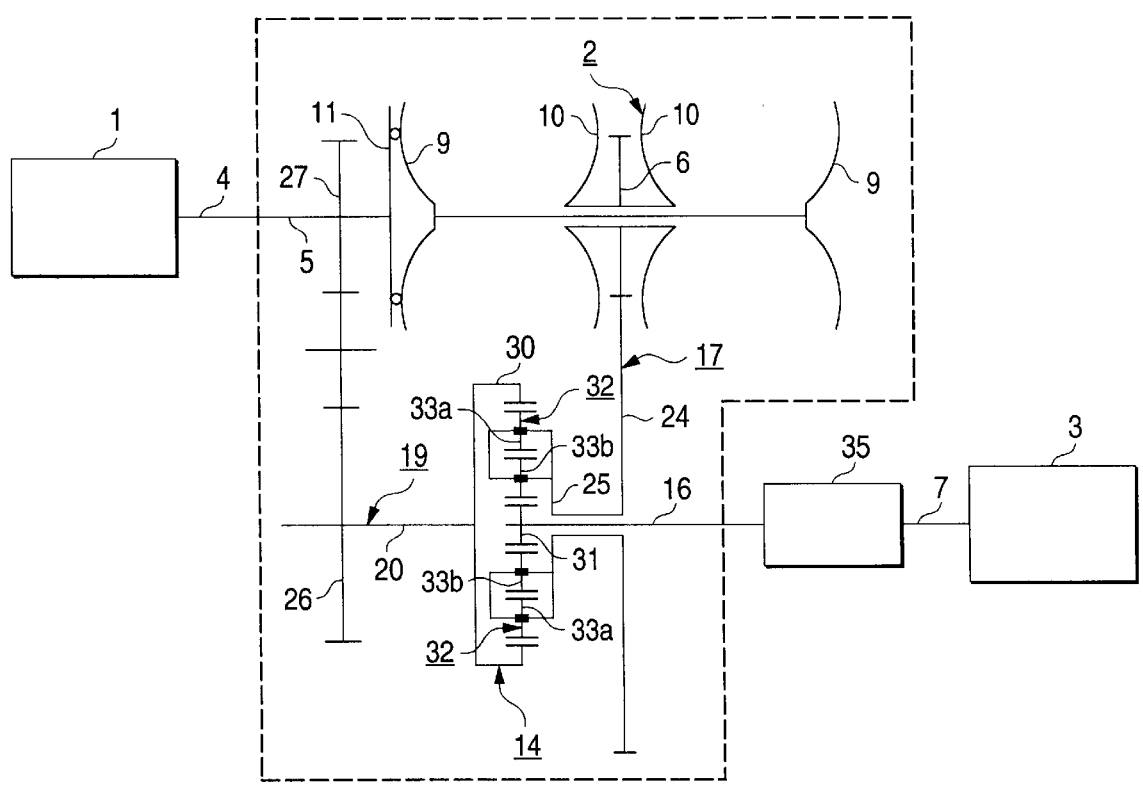
FIG. 15 is a schematic section view of a pump drive apparatus according to a thirteenth embodiment of the invention; and, FIG. 16 is a schematic section view of a pump drive apparatus according to a fourteenth embodiment of the invention.

Next, FIG. 15 shows a pump drive apparatus according to a thirteenth embodiment of the invention. In the present embodiment, a joint 35 is incorporated into the structure of the sixth embodiment shown in FIG. 8, more specifically, between the output shaft 16 and rotary shaft 7. The present embodiment is similar to the six embodiment in that the torque of power passing through the toroidal-type continuously variable transmission 2 can be reduced; and, the present embodiment is similar to the previously described ninth embodiment in that the joint 35 is disposed to thereby facilitate the conduct of the operation confirmation test. Therefore, the equivalent portions thereof are given the same designations and thus the duplicate description thereof is omitted here.

Figure 16:
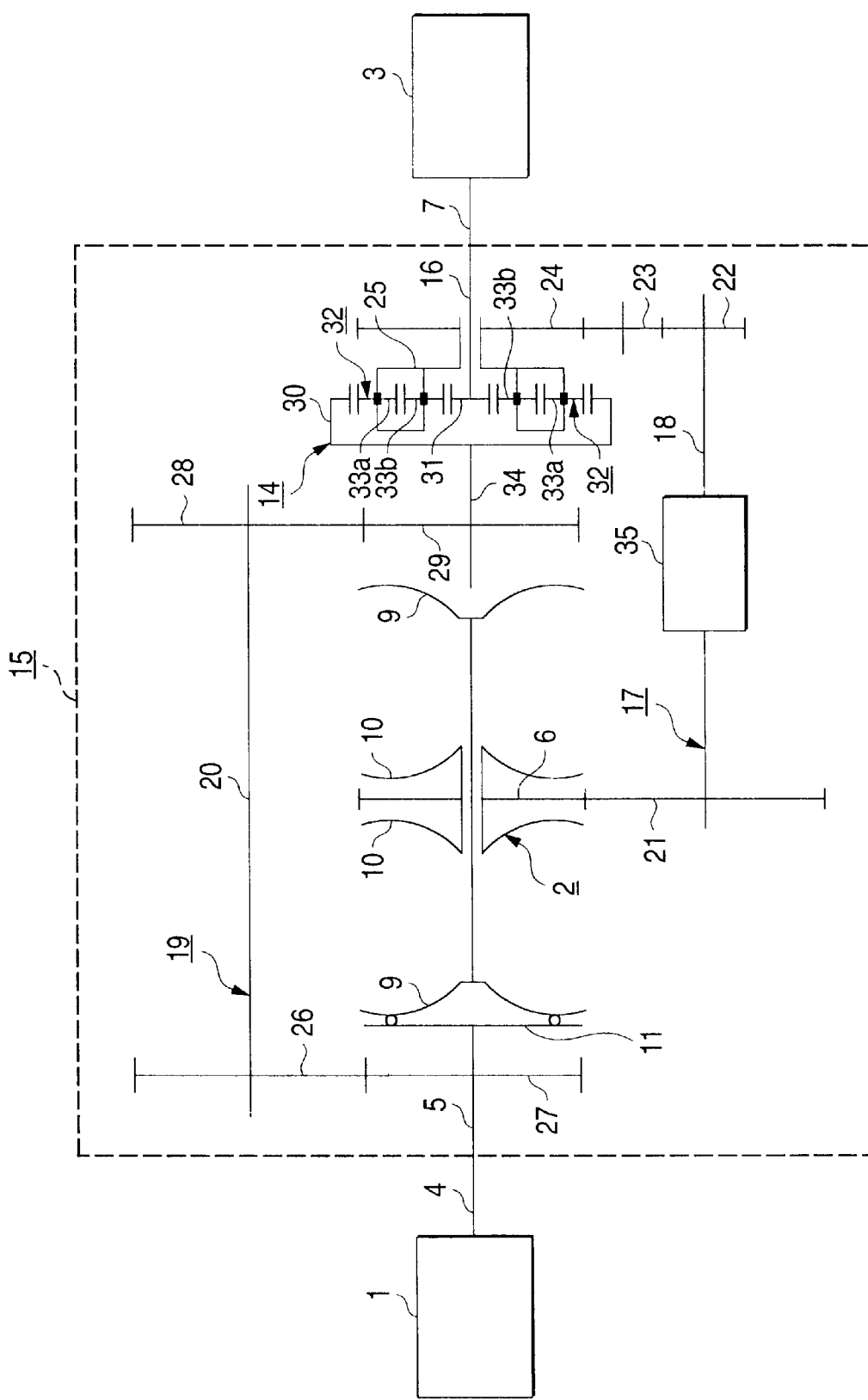

And, FIG. 16 shows a pump drive apparatus according to a fourteenth embodiment of the invention. In the present structure, in the intermediate portion of a first transmission shaft 18 which forms a first power transmission mechanism 17, there is disposed a joint 35 which can be freely engaged and removed. In the case of the present structure, by separating the joint 35, a carrier 25 forming a planetary gear mechanism 14 can be made to idle. Due to this, even in case where the electric motor 1 is operated, there is eliminated a fear that the water pump 3 having a rotation load can be driven and rotated, which can prevent the water pump 3 from being damaged owing to execution of an operation confirmation test. The present embodiment is similar to the fifth embodiment shown in FIG. 6 in that the torque of power passing through the toroidal-type continuously variable transmission 2 can be reduced. Therefore, the equivalent portions thereof are given the same designations and thus the duplicate description thereof is omitted here.

While only certain embodiments of the invention have been specifically described herein, it will apparent that numerous modifications may be made thereto without departing from the spirit and scope of the invention.

By the way, the foregoing description has been given of the case where a toroidal-type continuously variable transmission is used as a continuously variable transmission forming a pump drive apparatus according to the invention. However, in case where a water pump of a relatively small size is driven, that is, in case where drive torque is small, it is also possible to use a continuously variable transmission having a different structure such as a continuously variable transmission of a belt type.

Since the invention is structured and operates in the above-mentioned manner, there can be realized a pump drive apparatus which is low in the installation cost, is easy to install in a narrow space, and requires low energy for operation.

What is claimed is:

1. A pump drive apparatus comprising:
   a drive source;
   a pump driven and rotated by the drive source; and a continuously variable transmission interposed between said pump and said drive source.

2. A pump drive apparatus as set forth in claim 1, wherein said continuously variable transmission is a toroidal-type continuously variable transmission.

3. A pump drive apparatus as set forth in claim 2, wherein said drive source includes a drive shaft, said pump includes a rotary shaft, and said toroidal-type continuously variable transmission includes an input portion and an output portion, and wherein said drive shaft of said drive source is connected to said input portion of said toroidal-type continuously variable transmission in such a manner that the rotational force of said drive shaft can be transmitted to said input portion, and said output portion of said toroidal-type continuously variable transmission is connected to said rotary shaft of said pump in such a manner that the rotational force of said output portion can be transmitted to said rotary shaft.

4. A pump drive apparatus as set forth in claim 3, wherein said input portion is an input shaft and said output portion is an output gear.

5. A pump drive apparatus as set forth in claim 3, further comprising:

an accelerator interposed between said drive shaft and said input portion; and a decelerator interposed between said rotary shaft and said output portion.

6. A pump drive apparatus comprising:

a drive source;

a pump driven and rotated by the drive source, a continuously variable gear change apparatus interposed between said pump and said drive source, said continuously variable gear change apparatus including a toroidal-type continuously variable transmission and a planetary gear mechanism.

7. A pump drive apparatus as set forth in claim 6, wherein said drive source includes a drive shaft, said pump includes a rotary shaft, and said continuously variable gear change apparatus includes an input shaft and an output shaft, wherein said drive shaft of said drive source is connected to said input shaft of said continuously variable gear change apparatus, said output shaft of said continuously variable gear change apparatus is connected to said rotary shaft of said pump, and said toroidal-type continuously variable transmission and said planetary gear mechanism are interposed between said input and output shafts.

8. A pump drive apparatus as set forth in claim 7, wherein said input and output shafts are disposed concentrically with each other.

9. A pump drive apparatus as set forth in claim 7, further comprising:

a first power transmission mechanism for transmitting power inputted to said input shaft through said toroidal-type continuously variable transmission; and a second power transmission mechanism for transmitting power inputted to said input shaft not through said toroidal-type continuously variable transmission.

10. A pump drive apparatus as set forth in claim 7, wherein said planetary gear mechanism includes:

a sun gear;

a ring gear disposed on the periphery of said sun gear;

a planetary gear interposed between said sun gear and said ring gear; and a carrier for supporting said planetary gear in a rotatable manner.

11. A pump drive apparatus as set forth in claim 7, wherein said planetary gear mechanism is disposed laterally of said toroidal-type continuously variable transmission.

12. A pump drive apparatus as set forth in claim 3, further comprising:

a joint interposed between said output portion and said rotary shaft, said joint being freely engaged and removed.

13. A pump drive apparatus as set forth in claim 7, further comprising:

a joint interposed between said output shaft and said rotary shaft, said joint being freely engaged and removed.

14. A pump drive apparatus as set forth in claim 9, further comprising:

a joint located in the intermediate portion of said first power transmission mechanism, said joint being freely engaged and removed.

* * * * *